United States Patent
Waldherr et al.

(10) Patent No.: US 6,311,471 B1
(45) Date of Patent: Nov. 6, 2001

(54) STEAM COOLED FUEL INJECTOR FOR GAS TURBINE

(75) Inventors: Gregor Arthur Waldherr, Clifton Park; Robert Patrick Campbell, Loudonville; Sanjay Marc Correa, Niskayuna; Anthony John Dean, Scotia, all of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/227,370

(22) Filed: Jan. 8, 1999

(51) Int. Cl.$^7$ .............................................. F02C 3/30
(52) U.S. Cl. ........................ 60/39.05; 60/39.55; 60/740
(58) Field of Search ............................ 60/39.05, 39.06, 60/39.54, 39.55, 39.59, 39.83, 740

(56) References Cited

U.S. PATENT DOCUMENTS

| | | | | |
|---|---|---|---|---|
| 4,041,699 | * | 8/1977 | Schelp | 60/39.59 |
| 4,893,468 | * | 1/1990 | Hines | 60/39.55 |
| 4,982,564 | * | 1/1991 | Hines | 60/39.55 |
| 5,054,279 | * | 10/1991 | Hines | 60/39.59 |

* cited by examiner

Primary Examiner—Louis J. Casaregola
(74) Attorney, Agent, or Firm—Patrick K. Patnode; Christian G. Cabou

(57) ABSTRACT

A fuel injector is cooled by steam during operation of a combustor. The injector includes a conduit for channeling fuel into the combustor, and a jacket covering the conduit through which steam is channeled for cooling the injector. The steam may be mixed with the fuel, or kept apart from the fuel in the injector by flowing through passageways in the jacket. Cooling can be further improved by expanding the steam through an orifice prior to entry into the injector.

12 Claims, 5 Drawing Sheets

STEAM COOLED FUEL INJECTOR FOR GAS TURBINE

BACKGROUND OF THE INVENTION

This invention relates generally to industrial power turbines, and, more specifically, to low NOx combustors therein.

Industrial gas turbine engines may be used alone for producing power by rotating an electrical generator, for example, or may be used in a combined cycle with a steam turbine. Industrial gas turbines are continually being developed for increasing thermal efficiency, increasing specific work, reducing exhaust emissions, and reducing overhead and running costs associated therewith.

Higher thermal efficiency may be effected by increasing the firing temperature of the combustor. However, the higher combustion gas temperature increases the difficulty of reducing NOx (nitrogen oxide) emissions therefrom. NOx is one of several undesirable exhaust emissions, also including unburned hydrocarbons and carbon monoxide, which are reduced by various means.

Axially staged combustion is one method for reducing undesirable exhaust emissions while increasing the firing temperature. NOx emissions can be reduced by this method when compared to a single stage combustor. Axial staging is effected by providing fuel injection at several axial locations in a combustor correspondingly configured for this purpose. Primary fuel and air is injected at the upstream or dome end of the combustor in a first stage. As required, for meeting high power operation, additional or secondary fuel and air are injected at an axially downstream location to provide axially staged combustion.

An axially staged combustor provides low NOx operation in a dry configuration without the complexity of steam injection used in past generation industrial power turbines. However, the second stage, or secondary, fuel injectors required in axial staged combustion are necessarily located downstream in the combustor and are subject to heating by the combustion gases first generated by burning of the fuel and air mixture from the primary fuel injectors.

The secondary fuel injectors may be cooled using the fuel flow through these injectors or a portion of compressor bleed air for the injectors, but these techniques are of limited efficacy. During low power operation, the secondary fuel injectors may not be called upon to provide substantial fuel flow, so that insufficient fuel is available for cooling the secondary fuel injectors. Moreover, bleeding of compressor air for cooling the secondary injectors correspondingly decreases the overall efficiency of the engine.

Accordingly, it would be desirable to provide improved cooling of a secondary fuel injector in a dry, low NOx, axially staged combustor.

BRIEF SUMMARY OF THE INVENTION

A fuel injector is cooled by steam during operation of a combustor. The injector includes a conduit for channeling fuel into the combustor, and a jacket covering the conduit through which the steam is channeled for cooling the injector.

DETAILED DESCRIPTION OF THE INVENTION

Figure 1:
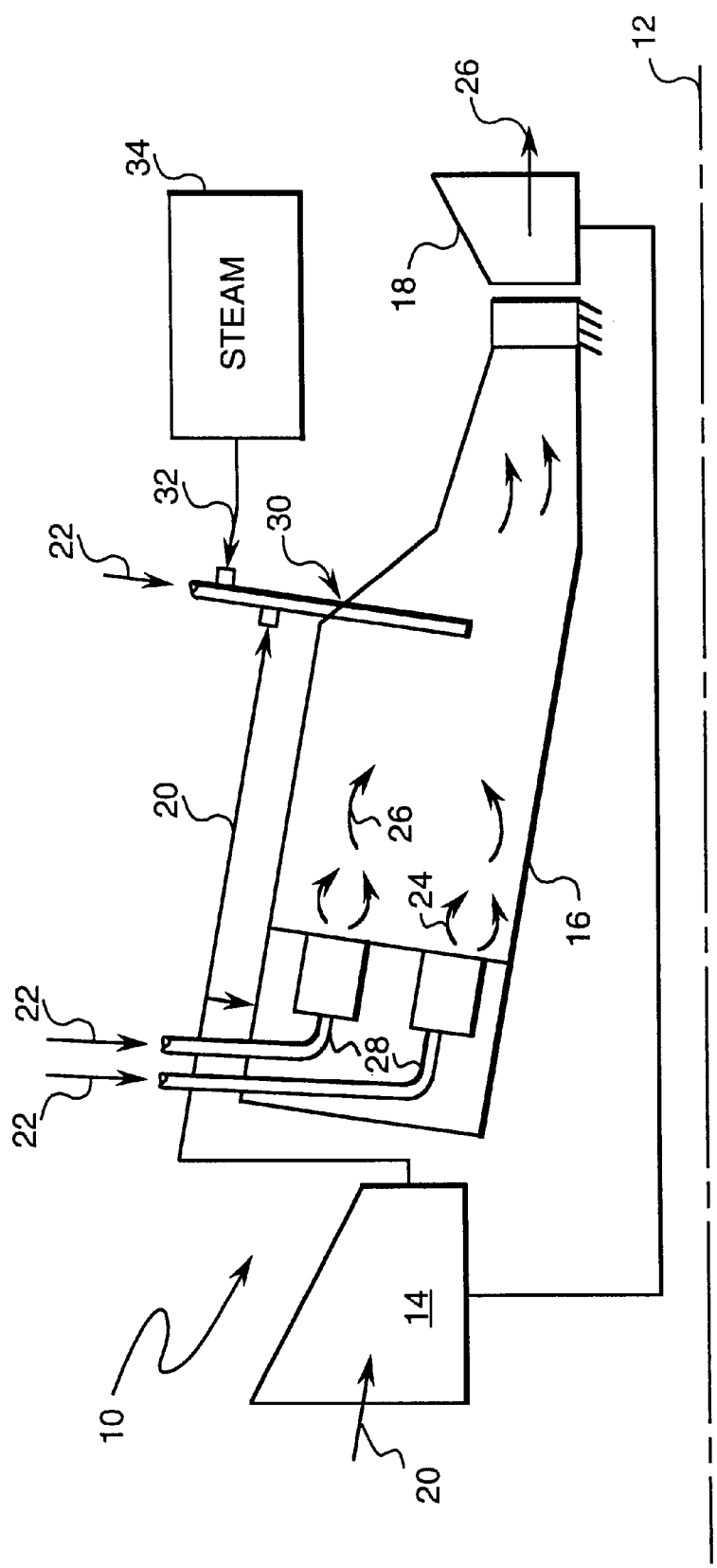
FIG. 1 is an axial schematic view of a portion of an industrial gas turbine engine including a compressor, combustor, and turbine with fuel injector cooling in accordance with one embodiment of the invention.

FIG. 1 illustrates a portion of an industrial gas turbine engine 10 configured for powering an electrical generator (not shown), for example. Engine 10 is axisymmetrical about a longitudinal or axial centerline axis 12 and includes in serial flow communication a multistage axial compressor 14, combustor 16, and high pressure turbine 18.

Air 20 is pressurized in compressor 14 and mixed with fuel 22 in the combustor for forming a fuel and air mixture 24 that is ignited to generate hot combustion gases 26 which flow downstream to turbine 18. The turbine extracts energy from the hot combustion gases for powering compressor 14. The engine also includes a power turbine (not shown) disposed downstream from high pressure turbine 18 which may be joined to the generator for producing electrical power.

Combustor 16 is in the exemplary form of a canannular combustor having a plurality of circumferentially adjoining tubular combustor cans which are joined together at the downstream ends in a common annulus for channeling the combustion gases to turbine 18.

In FIG. 1, combustor 16 is configured for axially staging fuel 22 in axially spaced-apart primary or upstream fuel injectors 28, and secondary or downstream fuel injectors 30. Except for secondary fuel injectors 30, engine 10 may be conventional in configuration and operation for effecting dry, low NOx emission combustion.

For example, primary fuel injectors 28 may be disposed in groups at the corresponding dome ends of the combustor cans in the form of premixers wherein fuel 22 is mixed with swirled air 20 and discharged in corresponding fuel and air mixtures 24 which are ignited for generating hot combustion gases 26. Primary injectors 28 are operated full time from engine idle through high power operation, and secondary injectors 30 are operated only when desired for providing additional power above idle operation. The primary and secondary injectors allow the combustor to axially stage the fuel for maximizing combustor efficiency while minimizing exhaust emissions, including NOx.

Secondary fuel injectors 30 may be of various configurations, but are subject to heating by hot combustion gases 26 formed upstream therefrom. Since the secondary injectors may be operated with little or no fuel, depending upon operating requirements, suitable cooling must be employed to achieve useful life for these injectors without damage due to excessive heating during operation.

Accordingly, and in accordance with a preferred embodiment of the invention, secondary fuel injectors 30 in various configurations are cooled by bathing the individual injectors 30 in steam 32 produced in a suitable steam generator 34 which, for example, may be a boiler producing steam for a combined cycle steam turbine (not shown). Since steam 32 has a substantially lower temperature than that of hot combustion gases 26, the steam is effective for cooling secondary injectors 30 against the heating effects of gases 26 during operation of the combustor.

In a gas turbine engine with axially staged combustion, the second stage fuel (or fuel and air mixture) injectors 30 are protected from overheating by using steam cooling. Steam cooling also delays onset of autoignition and prevents formation of carbon deposits. Delay of autoignition ensures proper mixing so that low NOx levels may be obtained.

There are several embodiments for steam cooling secondary injectors 30 in either open or closed steam circuits. In open circuit steam cooling, the steam is injected into the combustor after cooling the corresponding secondary injectors, whereas in closed circuit steam cooling, the steam is channeled separately from the fuel and air mixture and returned to steam generator 34 for reuse. When the steam is injected into the combustion gases, the fuel can be burned in a diffusion mode with steam NOx control, or the steam may be used for power augmentation of the gas turbine output if excess steam flow is permitted.

In the open circuit embodiments, steam temperature may be reduced by pre-expansion through an orifice, and the steam may also be used for film cooling the secondary injectors. Steam cooling effectiveness may be increased by varying the specific configuration of the various secondary injectors, and by including heat convection enhancers, such as turbulators, in the injectors.

Secondary injectors 30 may be of various configurations for channeling steam 32 in order to achieve cooling with varying fuel flow through the secondary injectors ranging from 0 to 100% of injector capacity, the fuel flow being controlled by the thermodynamic process required of the combustor and not by the cooling requirements of the fuel injectors themselves. Cooling is independently effected using steam 32 irrespective of any cooling capability of fuel 22 channeled through the secondary injectors during operation.

Figure 2:
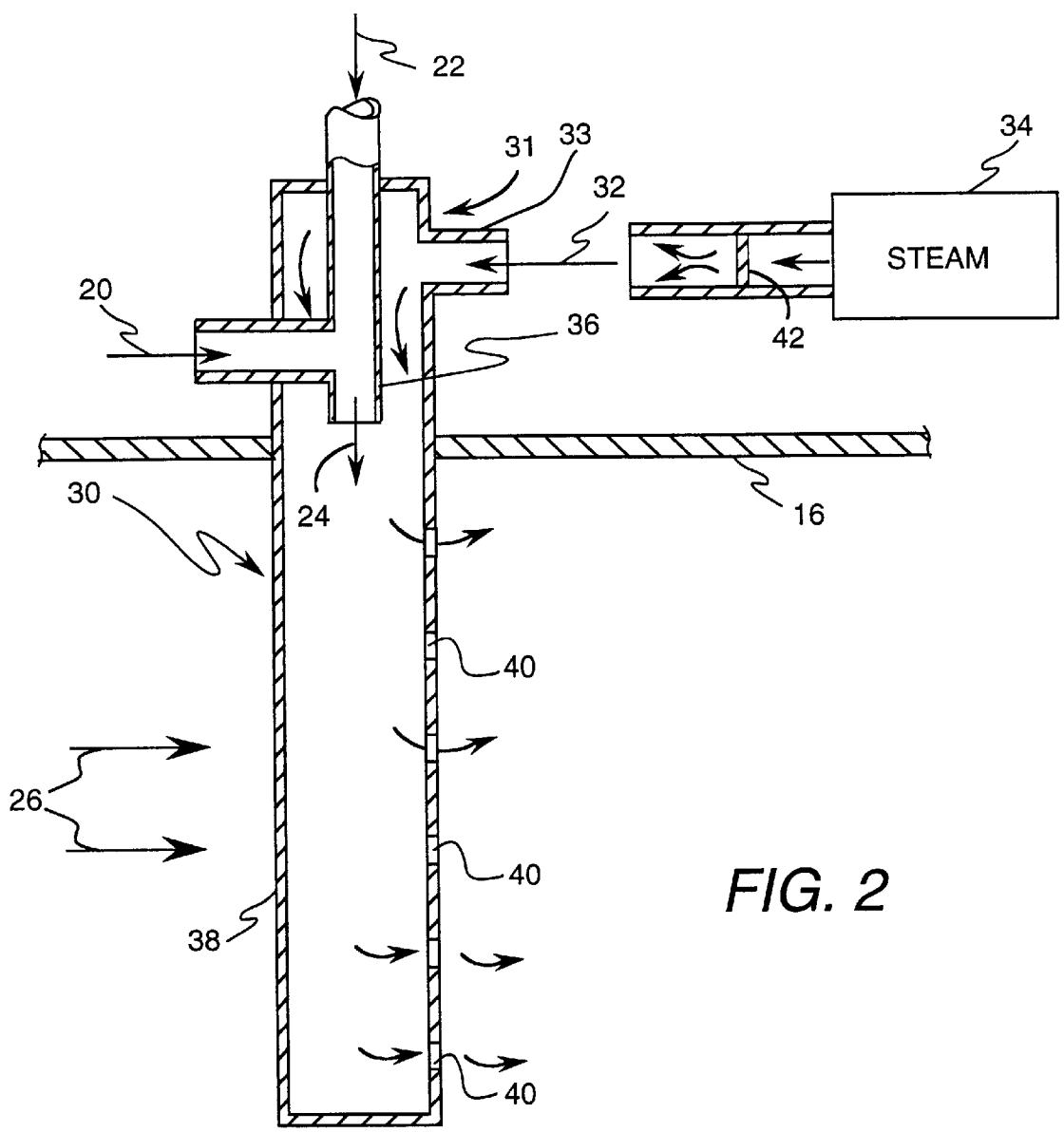
FIG. 2 is an enlarged, partly sectional, elevational view of a steam cooled fuel injector for the combustor illustrated in FIG. 1.

A first, relatively simple embodiment of the secondary fuel injector is illustrated in FIG. 2. The injector includes a tubular conduit 36 disposed at one end 31 of injector 30 in flow communication with a suitable fuel supply (not shown), for receiving fuel 22, such as natural gas. Conduit 36 includes a side inlet through which a portion of compressed air 20 is received from compressor 14 (FIG. 1) for premixing with fuel 22 inside conduit 36. The resulting fuel and air mixture 24 is discharged from an outlet at the distal end of conduit 36.

A tubular jacket 38 covers the distal end portion of fuel conduit 36 and includes a radially-directed inlet 33 at end 31 disposed in flow communication with steam generator 34 to receive steam 32. Steam generator 34, together with corresponding conduits joined to jackets 38 of the secondary injectors, define means for channeling the steam through the jackets to cool the secondary injectors.

In the embodiment illustrated in FIG. 2, secondary fuel injectors 30 (only one of which is shown) extend in part into the combustion zone of combustor 16 (FIG. 1) in which combustion gases 26 flow during operation. Jacket 38 effectively forms an extension of fuel conduit 36 and is immersed in the flowing combustion gases inside the combustor. The fuel injector is bathed in the steam channeled therein for cooling the injector against the heating effect of the combustion gases. In this way, secondary injectors 30 are steam cooled downstream from primary injectors 28 and are effective for providing dry, low NOx combustion in axial stages without combustion gases from the first stage damaging the fuel injectors of the second stage.

In the FIG. 2 embodiment, the fuel and air are premixed in fuel conduit 36 and discharged into the plenum defined by the surrounding tubular jacket 38, which also allows the fuel and air mixture to be premixed with cooling steam 32. Jacket 38 includes an axial row of outlet holes 40 disposed in flow communication with the outlet of fuel conduit 36 for injecting both the fuel/air mixture 24 and steam 32 into the combustor. In this way, the steam is injected into the combustor for mixing with the combustion gases after cooling the secondary injectors in an open cycle.

In the open cycle, steam 32 is preferably pre-expanded in a corresponding orifice 42 in the outlet path of steam generator 34 prior to delivery to jacket 38 and prior to cooling secondary injector 30. Pre-expansion of the steam reduces its temperature and therefore increases the cooling effectiveness of the steam resulting in more effective cooling of the secondary injectors.

The amount of steam cooling provided by steam injection correspondingly varies in response to the amount of fuel injected through the secondary injectors. At maximum fuel flow, a minimum amount of steam injection is required for cooling since the fuel itself provides cooling of the injector. At minimum or no secondary fuel flow through injectors 30, a maximum amount of steam cooling and injection is required for cooling the secondary injectors. However, the maximum amount of steam injection is generally equivalent to the cooling capability of the maximum amount of fuel flow in order to minimize the need for steam injection and maximize overall efficiency of the engine.

Figure 3:
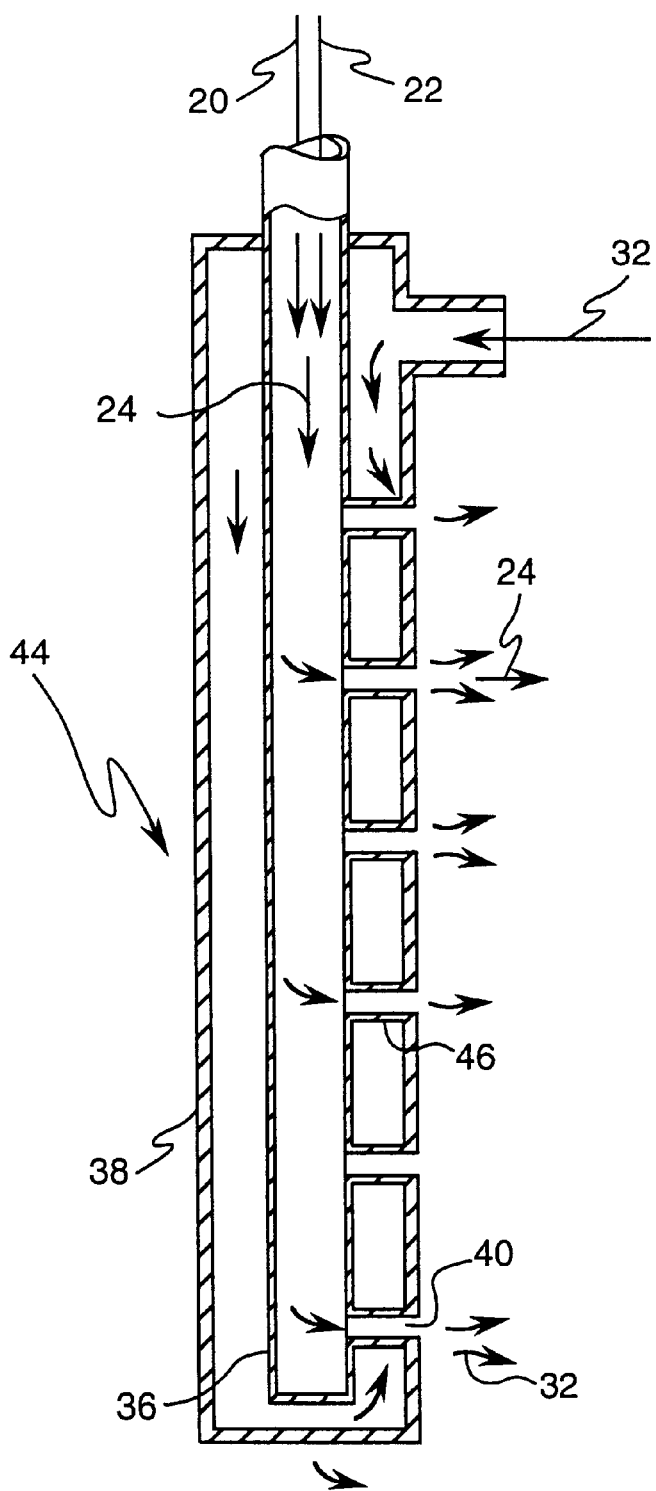
FIG. 3 is a partly sectional, elevational view of an alternative embodiment of the steam cooled fuel injector illustrated in FIG. 2.

FIG. 3 illustrates an alternative embodiment of secondary fuel injectors 44, which similarly include a tubular fuel conduit 36 through which air 20 and fuel 22 are channeled in premixture 24, with a surrounding tubular jacket 38 through which steam 32 is channeled. In this embodiment, the fuel and steam are channeled independently along the secondary injector in the space provided between concentric jacket 38 and conduit 36 therein.

Conduit 36 preferably includes a plurality of tubular fuel outlets 46 disposed in an axial row through corresponding ones of outlet holes 40 in jacket 38 for injecting the fuel into the combustor independently of the steam. In this embodiment, conduit 36 and jacket 38 have common or concentric outlets 46, 40, respectively, for discharging together both the fuel and air mixture 24 and steam 32 into the combustor. The jacket holes 40 are larger than fuel outlets 46 for discharging steam 32 into the combustor around respective ones of fuel outlets 46. Thus the steam is used to cool the fuel and air mixture 24 in a co-flowing arrangement, with the steam being ultimately injected into the combustor along with the fuel and air mixture. The steam passes through the annulus surrounding conduit 36 and acts as a shield for the fuel and air mixture flowing in conduit 36, which preferably extends the full length of jacket 38 so that it is fully immersed in the cooling steam 32 within jacket 38.

For an exemplary gas turbine combustor having a combustion gas temperature of about 2700° F., the amount of steam flow for cooling the secondary fuel injectors is relatively small, and no greater than about a few pounds per second of flow, as compared with over a thousand pounds per second of flow of air through the combustor for maintaining the temperature of the secondary injectors well below 1000° F.

Figure 4:
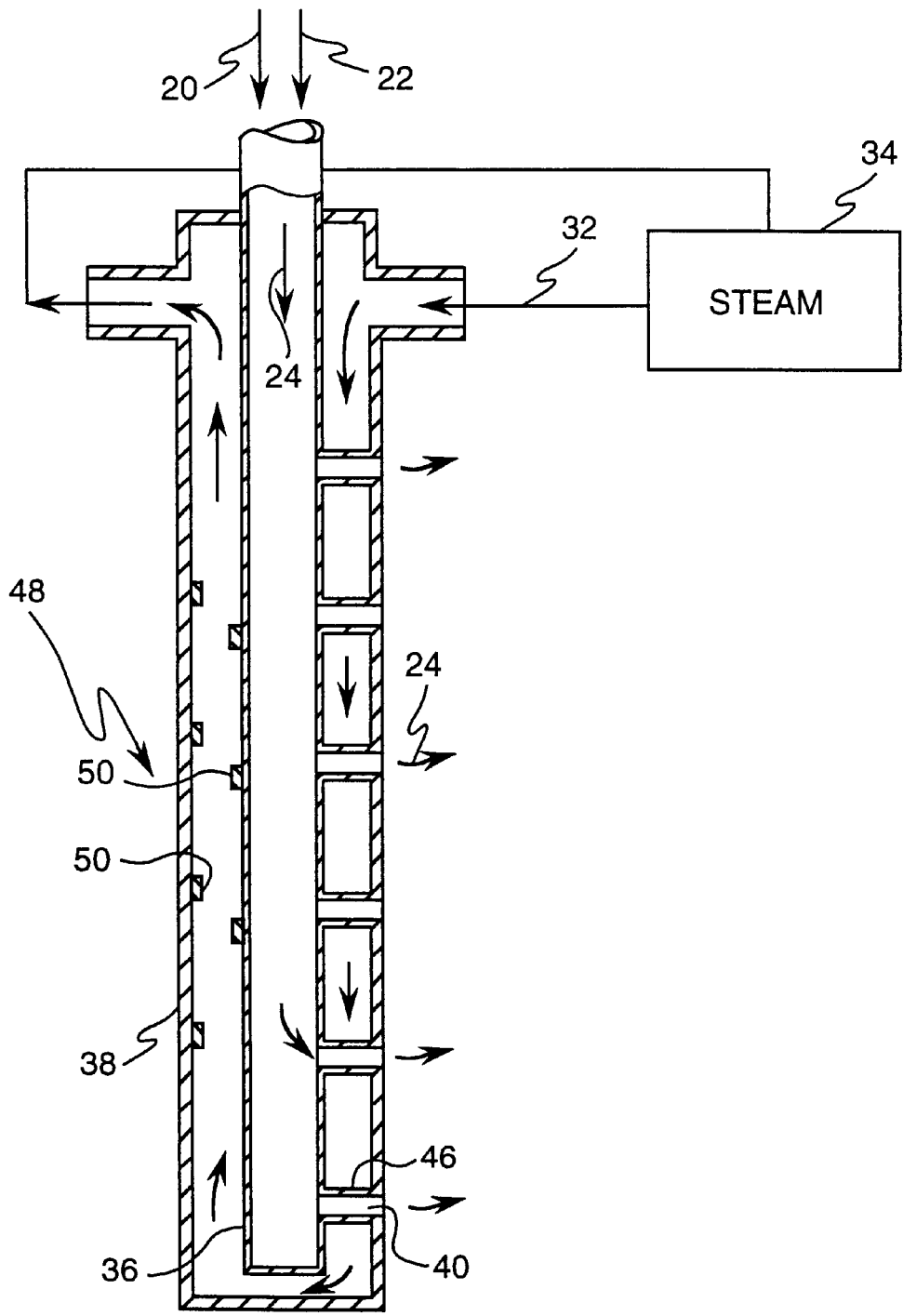
FIG. 4 is a partly sectional, elevational view of another alternative embodiment of the steam cooled fuel injector illustrated in FIG. 2.

FIG. 4 illustrates yet another embodiment of one of the secondary fuel injectors 48, which is similar to the FIG. 3 embodiment but specifically configured for removing the steam from the combustor after the steam has cooled the secondary injectors without mixing with the combustion gases in a closed cycle. In this embodiment, jacket 38 is sealingly joined to fuel outlets 46 around outlet holes 40 and therefore sealingly surrounds internal conduit 36 for preventing discharge of the steam into the combustor. Only the fuel and air mixture 24 is discharged into the conductor. In this way, steam 32 may be circulated through the secondary injectors for cooling the injectors and then returned to steam generator 34 in a closed loop for reuse.

If desired, any one of the several secondary fuel injectors, such as injector 48, may include a plurality of ribs or turbulators 50 disposed inside jacket 38 on the inner side, outer surface, or both, of conduit 36, for increasing heat transfer and cooling of both conduit 36 and jacket 38. Turbulators 50 trip the steam flow to enhance convection and thereby enhance cooling effectiveness.

Figure 5:
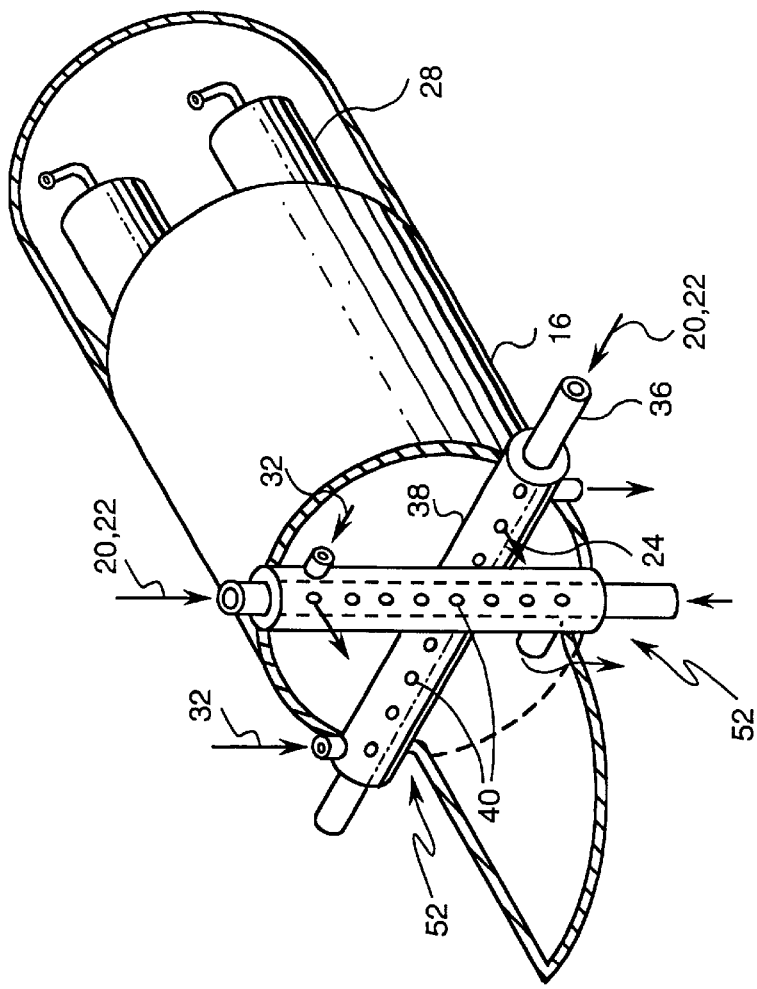
FIG. 5 a perspective view of another alternative embodiment of the fuel injector illustrated in FIG. 2, shown in a portion of the combustor in which it is employed.

FIG. 5 illustrates yet another embodiment of one of the secondary fuel injectors 52, which again include fuel conduits 36 extending through corresponding jackets 38. The jackets include outlets 40 sealingly joined with fuel outlets 46 of inner conduit 36 in a manner identical to that illustrated in FIG. 4, but the fuel injectors extend completely across the individual combustor can 16 in an independent and crossing configuration for again channeling steam 32 in a closed loop.

The fuel injectors may have individual circuits for feeding the steam and returning the steam to the steam generator 34. Alternatively, the injectors may be linked across the combustor to create a network of feed and return lines. In a closed steam circuit, the energy recovered by using the steam for first cooling the fuel injectors may be applied to other parts of the gas turbine cycle, such as in an associated steam turbine.

Figure 6:
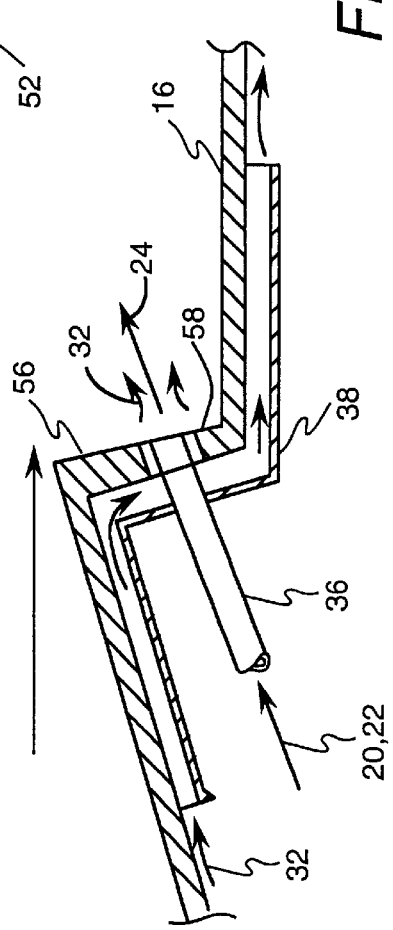
FIG. 6 a partly sectional alternative embodiment of the fuel injector illustrated in FIG. 2 for use in a stepped combustor.

FIG. 6 illustrates yet another embodiment of one of the secondary fuel injectors 54, wherein combustor 16 includes a wall having a step or ramp 56 which faces in the downstream or aft direction, as shown by the horizontal arrow. The secondary injectors are spaced around the circumference of the combustor and each includes a fuel conduit 36 for injecting the premixed fuel and air into the combustor. Conduit 36 is disposed outside the combustor wall in flow communication with the combustor through an outlet 58 in the step.

Jacket 38 is in the form of a sheet metal baffle which adjoins a portion of outer surface of the combustor and through which fuel conduit 36 extends. Steam 32 is channeled through jacket 38 for cooling the jacket and is also channeled through the local portion of the combustor at fuel conduit 36 for cooling the entire secondary injector 54 with steam. Outlet 58 is suitably larger than conduit 36 for allowing a portion of cooling steam 32 to be injected into the combustor in an open cycle. If desired, outlet 58 may be sealingly joined to the outlet end of conduit 36 to prevent discharge of the steam into the combustor in effecting a closed cycle.

The various embodiments disclosed above introduce steam cooling of the secondary fuel injectors in various forms in open or closed cycles as desired. Relatively little steam is required for effectively cooling the injectors, and in the open cycle does not adversely affect the thermodynamic cycle. Axially staged dry, low NOx combustion is effected with or without steam discharge into the combustor, while cooling the corresponding secondary injectors.

Steam cooling may also be applied to other forms of the secondary fuel injectors with increasing levels of complexity compared with the relatively simple fuel injectors disclosed above.

While only certain preferred features of the invention have been illustrated and described, many modifications and changes will occur to those skilled in the art. It is, therefore, to be understood that the appended claims are intended to cover all such modifications and changes as fall within the true spirit of the invention.

What is claimed is:

1. A method for cooling a fuel injector in a gas turbine engine combustor, said fuel injector being positioned to be heated by direct contact with flow of hot combustion gases, said method comprising supplying steam to said fuel injector during operating of said combustor in order to prevent excessive heating of said fuel injector and independently channeling fuel and said steam through said fuel injector.

2. A method for operating a gas turbine engine combustor, comprising:
   axially staging fuel into said combustor in axially spaced apart primary and secondary fuel injectors;
   steam cooling said secondary injectors downstream from said primary injectors;
   said secondary fuel injectors being immersed inside said combustor whereby combustion gases are channeled thereover; and
   independently channeling said fuel and steam along said secondary injectors.

3. A method according to claim 2 further comprising removing said steam from said combustor after cooling said secondary injector without mixing said steam with said combustion gases.

4. A method according to claim 2 further comprising injecting said steam into said combustor for mixing with said combustion gases after channeling of said steam through said secondary injectors.

5. A method according to claim 4 further comprising pre-expanding said steam prior to cooling said secondary injectors for increasing cooling thereof.

6. A fuel injector for a gas turbine combustor comprising:
   a conduit for channeling fuel into said combustor;
   a jacket extending around said conduit; and
   an inlet for channeling steam through said jacket to cool said injector;
   the conduit and jacket having a plurality of common outlets for discharging both said fuel and steam into said combustor.

7. A fuel injector for a gas turbine combustor comprising:
   a conduit for channeling fuel into said combustor;
   a jacket extending around said conduit; and
   an inlet for channeling steam through said jacket to cool said injector;
   said jacket including a plurality of outlets disposed in flow communication with said conduit for injecting both fuel and steam into said combustor.

8. A fuel injector for a gas turbine combustor comprising:
   a conduit for channeling fuel into said combustor;
   a jacket extending around said conduit; and
   an inlet for channeling steam through said jacket to cool said injector;
   said jacket being concentric with said conduit; and said conduit including a plurality of fuel outlets extending through corresponding holes in said jacket for injecting said fuel into said combustor.

9. An injector according to claim 8 wherein said jacket is sealingly joined to said fuel outlets around said holes for preventing discharge of said steam into said combustor.

10. An injector according to claim 8 wherein said holes in said jacket are larger than said fuel outlets for discharging said steam into said combustor around respective ones of said fuel outlets.

11. An injector according to claim 10 and further including a steam generator having an orifice in an outlet path for expanding said steam prior to delivery to said jacket and thereby increasing cooling of said conduit by said steam.

12. An injector according to claim 8 further comprising a plurality of turbulators disposed inside said jacket to increase cooling of said conduit by said steam.

* * * * *